Oct. 14, 1958 M. H. ALLDREDGE 2,855,665
BALL JOINT
Filed June 25, 1953 2 Sheets-Sheet 2
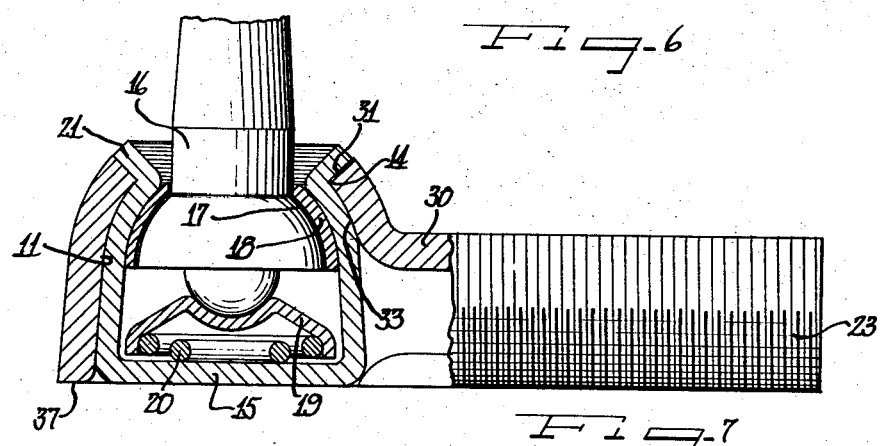
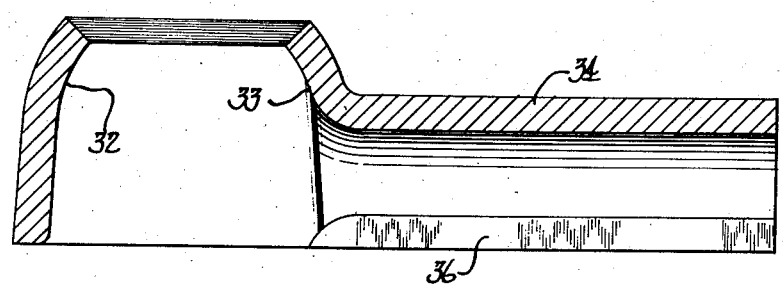
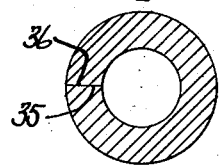
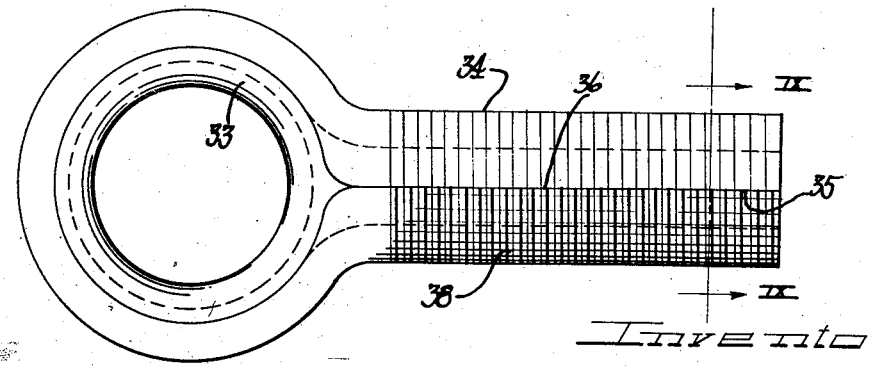
Inventor
Marshall H. Alldredge United States Patent Office 2,855,665
Patented Oct. 14, 1958

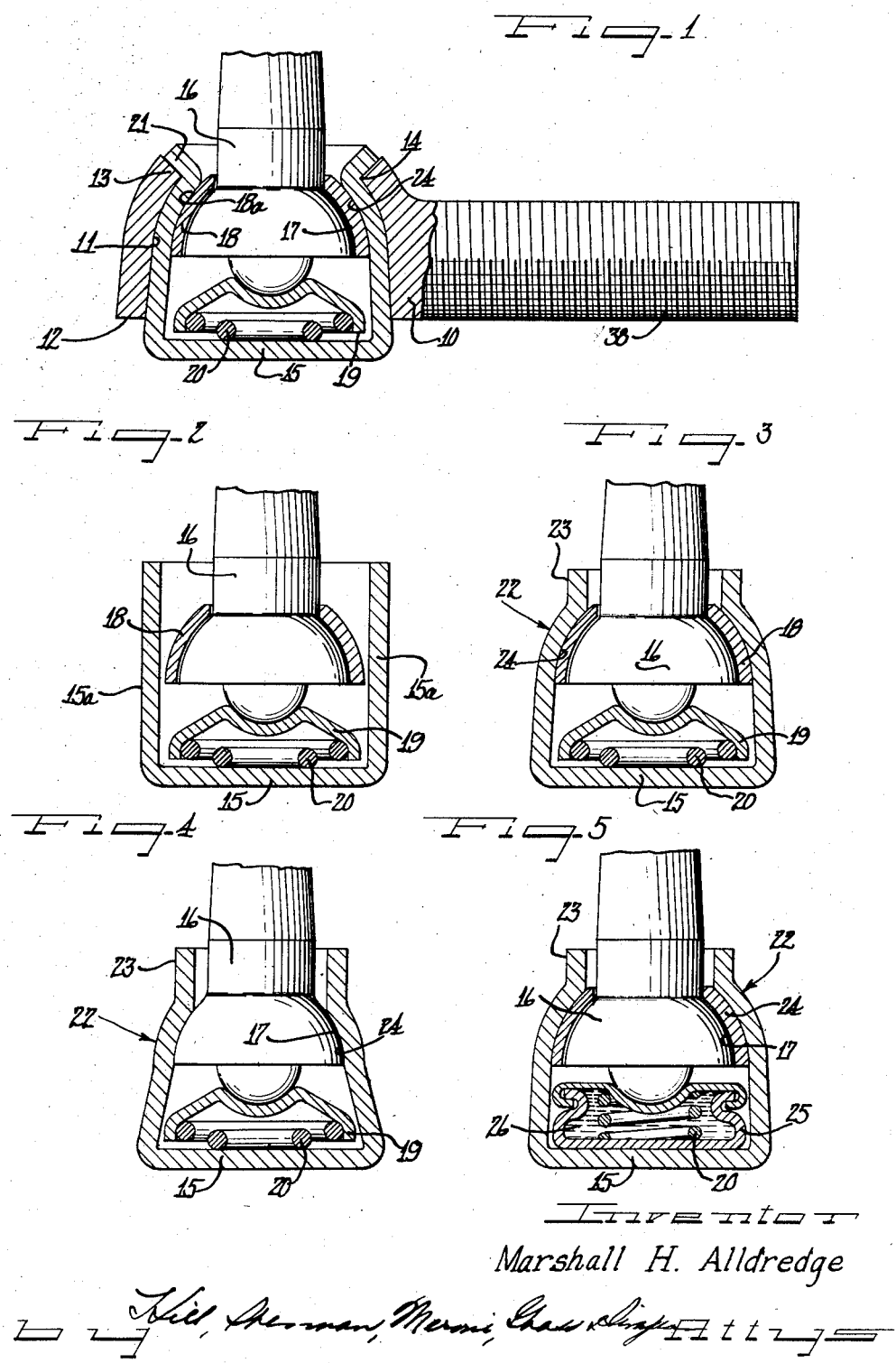

2,855,665

BALL JOINT

Marshall H. Alldredge, Detroit, Mich., assignor to Thompson Products, Inc., Cleveland, Ohio, a corporation of Ohio Application June 25, 1953, Serial No. 363,966

2 Claims. (Cl. 29—441)

This invention relates to universal joints of the type commonly designated as ball joints. More particularly, the invention relates to a novel construction and method of manufacturing a ball joint which greatly reduces the manufacturing costs thereof while at the same time providing a superior and more serviceable ball joint construction.

The field of ball joint construction, especially as it relates to the use of such joints in automotive steering systems and other similar uses, is very highly developed. This is partially due to the fact that ball joints play a very large part in the effectiveness of modern automotive steering systems, the production of which requires upwards of 10,000,000 ball joints a year for new vehicle use alone. Other factors, however, also contribute to the highly developed state of the art. For example, the fact that extreme safety is required in ball joint constructions to be utilized in modern high speed vehicles and the seemingly conflicting requirement of inexpensiveness cause continued searching for a ball joint acceptable to the industry.

In view of the tremendous number of joints needed to satisfy the industry and in view therefore of the possibility of tremendous annual savings in reducing costs, if the other design considerations can at the same time be met, a great effort has been made throughout the industry to construct an acceptable ball joint at a minimum cost. This tremendous activity has of course produced a great volume of prior art structures both patented and unpatented. To my knowledge, however, none of the prior art structures have embodied the construction and method of assembly herein disclosed and which substantially reduces the cost of construction of a ball joint while at the same time providing a ball joint structure fully meeting all of the remaining design considerations.

According to the present invention a simplified ball joint housing is provided which has a transversely bored eye or aperture extending therethrough. Into this transversely bored aperture a ball stud and bearing sub-housing assembly is inserted and permanently positioned by means of deforming an annular flange of the sub-housing over a cooperating peripheral wall of the ball joint housing. The sub-housing is constructed by spinning or otherwise pressing a cup-shaped housing containing all of the spring elements as well as the necessary bearing surfaces of the usual ball joint down over the upper bearing surface of the usual ball stud. This provides a complete ball stud and bearing sub-assembly in which all of the bearing surfaces are sufficiently smooth for the necessary universal action and yet do not require the intricate machining generally considered necessary in the prior art. By the use of a ball joint housing having an extremely simple eye or transverse bore configuration in combination with the simply manufactured ball stud sub-assembly, it is possible through the use of the present invention to provide a ball joint in which substantially all of the housing parts are constructed of sheet metal thereby reducing the costs of construction very substantially below the costs heretofore believed possible.

It is therefore an object of the present invention to provide a simplified ball joint construction.

Another object of the present invention is to provide a ball joint construction requiring an absolute minimum of machining of curved surfaces.

Still another object of the present invention is to provide a ball joint utilizing a composite structure in which a separate, inexpensive, sub-assembly containing a ball stud and its associated bearing surfaces is permanently secured to the ball joint housing.

Yet a further object of the present invention is to provide a ball joint utilizing sheet metal exclusively for the ball joint housing portions.

Yet another object of the present invention is to provide a novel ball joint housing in which separation of the ball joint and bearing elements therefrom is absolutely impossible, thereby eliminating inadvertent disassembly during operation thereof.

Still another object of the present invention is to provide a method of manufacturing ball joints which permits the use of extremely high speed fabricating equipment.

Yet another object of the present invention is to provide a novel method of assembling a ball joint and housing combination structure.

Still another object of the present invention is to provide a method of manufacturing a ball joint in which the bearing surfaces of the ball joint housing are manufactured by spinning the bearing surface material down upon the ball stud bearing surface without further manufacturing steps.

Still other and further objects will at once become apparent to those skilled in the art from a consideration of the attached sheets of drawings in which several modifications of the present invention are shown by way of illustration only.

On the drawings:

Figure 1 is a cross sectional view in elevation of an assembled ball joint constructed according to the present invention;

Figure 2 is an elevational view in partial cross section showing the parts utilized in constructing the present invention in an initial state of construction.

Figure 3 is an elevational view in partial cross section showing the parts of the present ball joint in a further stage of construction in which a finished sub-housing has been provided;

Figure 4 is a modified form of sub-housing constructed according to the concepts of the present invention;

Figure 5 is still a further modification of the sub-housing constructed according to the present invention;

Figure 6 is an elevational view in partial cross section showing a modified form of a ball joint constructed according to the present invention and utilizing sheet metal exclusively for the housing structures;

Figure 7 is a plan view of the sheet metal ball joint housing shown in Figure 6 prior to complete assembly of the joint;

Figure 8 is a cross sectional view in elevation taken along the lines of VIII—VIII of Figure 7; and Figure 9 is a cross sectional view taken along the lines of IX—IX of Figure 7 and showing a cross sectional construction of the sheet metal ball joint housing of the present invention.

As shown on the drawings:

In the modification of the ball joint construction as shown in Figures 1, 2 and 3, a ball joint housing 10 is contemplated having a barrel-shaped transversely extending eye or aperture 11 therein. This aperture extends from the bottom face 12 of the housing 10, at which point it has its maximum diameter, to a flared peripheral edge 13 at the upper side of the housing 10. As may be seen from Figure 1 a restricted, or bottle-neck portion 14 is provided immediately adjacent the upper end 13 of the aperture 11 for purposes which will be more fully described below.

Within the barrel-like aperture 11, a sub-housing 15 is positioned. This sub-housing contains within its walls all of the moving elements of the ball joint namely, the ball stud 16 having a segmental spherical bearing surface 17, the segmental floating bearing 18, the pressure plate 19 and the ball joint tensioning spring 20. As is readily apparent from a consideration of Figure 1, all of the moving parts of the ball joint are permanently retained within the sub-housing 15 which is in turn permanently retained in the ball joint housing 10 by means of the spun-over flange 21.

In constructing the above described ball joint structure, the sub-housing is preferably constructed according to the steps illustrated in Figures 2 and 3. In these views, the parts are first shown, in Figure 2, in the stage of manufacture immediately prior to the assembly of the ball joint sub-housing. In that figure, the ball stud 16 is positioned with the bearing 18 surrounding the bearing surface 17 and with the pressure plate 19 compressing the tension spring 20 into a position substantially the same as that found in its finally assembled condition. The housing 15, which comprises a cup-shaped member having a bottom 15 and cylindrical walls 15a, is then deformed radially inwardly along its axis as shown in Figure 3 at 22 leaving only the short portion at the upper end of the cylindrical wall 15a, providing a substantially cylindrical extension 23.

The construction shown in Figure 3 is the finished sub-housing. In spinning the wall 15a inwardly as indicated at 22 in Figure 3, the inner surface 24 takes substantially the exact configuration of the external surface 18a of the bearing 18 and since it is general practice to provide the bearing 18 with a very smooth, machined outer surfaces 18a, the inner surface 24 of the sub-housing will have a substantially perfect segmental-spherical bearing surface. Thus the bearing surfaces 24, 18a, and the surface 17 which cooperates with the inner surface of the bearing 18 will all have a degree of smoothness and accuracy required by the industry in ball joints of this type.

It will of course be apparent that the degree of finish found on the exterior surface 22 of the sub-housing 15 and on the interior surface 11 of the housing 10 is of relatively small importance. These surfaces cooperate in the assembly of the housing 10 and the sub-housing 15 but do not perform any bearing function and hence grooves resulting from spinning operation or from rough machining the housing 10 are of substantially no importance. This feature is of extreme importance since, as those familiar with manufacturing costs are well aware, the accuracy of the finish required and hence the number of finishing operations necessary plays a large part in determining the ultimate total manufacturing costs. Parts which may be manufactured with ordinary machining and stamping tolerances are far less expensive both from the point of view of the equipment involved and in the time of manufacture than structures which require very careful machining throughout.

The sub-housing 15 shown in Figure 3 is assembled into the housing 10 in the manner shown in Figure 1 by spinning or pressing down the flange 21 by any known means, such as for example, a rotating spinning tool or by means of a single acting swage. Once the flange 21 has been formed downwardly against the surface 13 and over the bottle neck ridge 14, it is apparent that it is impossible to remove the sub-housing 15 from the housing 10 without completely destroying the ball joint. Since the bottom plate of the sub-housing 15 is integral with the sub-housing casing 15 itself, there is absolutely no possibility of the spring pressure plate 19, the spring 20 or any other of the ball stud moving elements becoming inadvertently disassembled through the bottom plate as is possible in the usual prior art construction.

Thus, as may be seen from Figure 1, the ball joint constructed according to the present invention provides a completely sealed unit which cannot possibly become disassembled and yet which requires absolutely no special threading equipment, lock nuts or other similarly expensive retaining mechanisms. In view of the inexpensive nature of the construction of the present ball joint it is contemplated that the entire apparatus may be thrown away when it becomes worn and replaced with a completely new unit at a cost substantially less than that of rebuilding or purchasing the ordinary type of ball joint unit, thereby effecting great savings for the consumer.

Figures 4 and 5 show further modifications of the sub-assembly which may be utilized in place of the sub-assembly 15 above described. In Figure 4, the bearing 18 is dispensed with, but the remainder of the construction is identical to that shown in Figure 1 through 3. While it is of course desirable to provide the floating bearing 18 in order to permit a somewhat wider range of tilting movement, it has been found that the method of internally spinning or pressing the member 15 at 22 can be very acceptably performed on the hardened bearing surface 17 without the presence of the bearing 18. In certain ball joint constructions in which it is desired that an absolute minimum of expense be incurred, the elimination of the floating bearing 18 may be desired. In some such cases in which free sliding action is unnecessary such an arrangement will, in fact, cause no reduction in efficiency in the joint.

In the modification shown in Figure 5, a capsule 25 is provided in which a silicone polymer 26, for example, is provided for maintaining the bearing surfaces in a snug contact with each other. The use of such a silicone fluid, which has a characteristic of rigidity under impact force load but adjustability under gradually applied loads, provides an effective means whereby the ball joint bearing surfaces are maintained in tight relationship at all times. The present construction is particularly adapted to use in combination with such a fluid filled capsule since such a capsule permits automatic wear take-up over wide ranges without any loss in bearing efficiency. Under such circumstances the elimination of threaded bottom plugs and other similar devices which may, in certain installations in the prior art, be utilized for adjustment purposes, is not found to be a disadvantage in any way.

In the Figures 6 through 9, I have shown a second modification of the housing which may be utilized with the sub-assembly of the present invention. In these figures a housing 30 is provided and is constructed completely of sheet metal. In manufacturing the sheet metal housing 30, a flat blank having a length substantially equal to the total length of the housing 30 including the eye portion is initially pierced at 31 and cupped at 32, 33 to provide a barrel-like eye. The remaining portion of the blank 34 is then rolled so that the edges 35 and 36 abut each other forming a tube as shown in Figure 9.

The external peripheral surface of the tube may of course be threaded at 38 when the ball joint housing 30 is to be utilized with the conventional internally threaded tie rod or drag link members. In the alternative, however, the outer surface may be machined for any other type of connecting association with an operating link.

In assembly of the sheet metal housing 30 with the sub-assembly 15 shown in Figure 3, the operations performed in connection with assembly of the latter unit into the housing 10 are performed in a manner identical to that above described in connection with Figure 1, with the flange 21 being turned downwardly against the peripheral edge 31 of the housing 30.

As may be seen from Figure 6, the entire sub-assembly has been inserted to a point wherein the bottom surface 15 thereof is flush with the bottom surface 37 of the housing 31. This has been accomplished in this modified form by extending the upwardly bulged or necked portion 33 of the sheet metal housing 30 to a somewhat greater extent than the deformation given the housing shown in Figure 1. It is to be understood, however, that if it is desired that a flush arrangement be utilized in the housing structure shown in Figure 1, it may readily be provided in a manner identical to that utilized in the modification shown in Figure 6 by merely expanding the upwardly bulged edge of the barrel-shaped aperture 11 to permit the entire sub-assembly 15 to be positioned within the interior thereof.

It will thus be seen that I have provided a novel ball joint structure which is readily adaptable to manufacture from either sheet metal or an extremely simple pierced forging. An absolute minimum of machining is necessary in the outer housing itself since no surfaces in the outer housing actually perform a sliding bearing function. The simple sub-assembly or sub-housing may be inexpensively made and is readily adapted to the use of high speed press or spinning equipment. When utilizing a sub-housing constructed according to the present invention, the inner bearing surface of the housing member is machined automatically without the use of special equipment and may be readily assembled in the outer housing at any time, not necessarily at the time that the sub-assembly was constructed. This latter feature is of substantial importance since it is often desirable to manufacture a large number of sub-assemblies for use in various different types of ball joint outer housings.

By using a single ball joint sub-assembly in cooperation with large number of different external housing configurations and connecting means, such as for example varying threads, clamp structures, etc., it is possible to completely eliminate special, or non-standard, set ups for assembling the actual working parts of the ball joints. All that is necessary to change a manufacturing set up from a construction of ball joints for one particular type of automobile or steering system to the requirements of another is to change the machinery set up for the external housing alone. This may simply be done by providing a different jig for holding the housing in the final spinning operation in which the flange 21 is spun, pressed, or swaged outwardly against the peripheral edges 21 or 31.

As discussed above, it is intended that the entire ball joint unit including the outer housing 10 or 30 and the sub housing 15 be replaced as a unit. However, it is to be understood that the present unit can also be rebuilt easily when heavy machinery is available. In such an operation the relatively heavy housing 10 or 30 is supported in a jig having an aperture equal to the diameter of the sub-housing 15. The sub-housing 15 is placed over the aperture and the ball stud 16 is pressed downwardly by means of an hydraulic ram deforming the flange 21 inwardly and allowing withdrawal of the sub-assembly.

After such an operation the sub-assembly is of course beyond repair but a new sub unit may easily be inserted in the outer housing thereby providing a joint substantially as good as new. This method of rebuilding will of course render replacements even less expensive than before and in view of the standardization possible through the use of the sub-assembly herein disclosed only one type of ball stud unit need be kept in stock to repair or rebuild all types of joints.

It is noted of course that rebuilding in the manner above described can be accomplished an indefinite number of times since the outer housing is in no way affected by insertion or removal of the sub-assembly.

It is of course understood that variations and modifications may be made to the above disclosed construction without departing from the scope of the novel concepts disclosed herein and it is therefore not intended that this invention be limited otherwise than as necessitated by the appended claims.

I claim as my invention:

1. A method of constructing a ball joint which comprises positioning a ball stud having an enlarged head thereon within a cup-shaped member, constricting said cup-shaped member about said enlarged head and adjacent the neck of said stud, positioning said assembled stud and cup within the bore of a housing, and outwardly deforming the end of said cup adjacent said neck around the end of said bore to permanently assemble said cup within said housing.

2. The method of manufacturing a ball joint which comprises positioning a spring in the bottom of a cylindrical cup, placing a pressure plate thereover and positioning a stud having an enlarged head against said pressure plate, thereby compressing said spring, constricting the side walls of said cup around said enlarged head adjacent the neck of said stud, positioning said cup within a constricted bore in an outer housing, and deforming the open end of said cup above said constriction about said constricted portion of said bore.

References Cited in the file of this patent

UNITED STATES PATENTS

| | | |
|---|---|---|
| 1,829,306 | Sneed | Oct. 27, 1931 |
| 1,873,172 | Ahlers | Aug. 23, 1932 |
| 1,899,645 | Sneed | Feb. 28, 1933 |
| 1,923,601 | Weaver | Aug. 22, 1933 |
| 1,957,002 | Searles | May 1, 1934 |
| 2,236,062 | Katcher | Mar. 25, 1941 |
| 2,274,420 | Katcher | Feb. 24, 1942 |
| 2,516,688 | Flumerfelt | July 25, 1950 |
| 2,618,049 | Flumerfelt | Nov. 18, 1952 |
| 2,636,758 | Flumerfelt | Apr. 28, 1953 |

FOREIGN PATENTS

| | | |
|---|---|---|
| 488,311 | Germany | Dec. 23, 1929 |
| 301,624 | Switzerland | Nov. 16, 1954 |